United States Patent Office 3,381,027
Patented Apr. 30, 1968

3,381,027
PREPARATION AND RECOVERY OF METHYL
2-KETOGLUCONATE
Gerald Myer Jaffe and Edward John Pleven, Verona, N.J.,
assignors to Hoffmann-La Roche Inc., Nutley, N.J., a
corporation of New Jersey
No Drawing. Filed Apr. 22, 1964, Ser. No. 361,880
4 Claims. (Cl. 260—483)

ABSTRACT OF THE DISCLOSURE

Relatively pure methyl 2-ketogluconate suitable for conversion to sodium erythrobate or erythrobic acid without terminal purification steps is prepared directly from fermentation broths obtained from the action of bacteria of the genus Pseudomonas on nutrient solutions containing a suitable carbohydrate or gluconate salt by treating the broth with sufficient sulfuric acid to precipitate from about 85% to about 97% of the calcium ions present in the broth, filtering the treated broth, treating the filtrate with activated charcoal, separating the charcoal from the solution, then treating the solution with a cation exchange resin, eluting from the cation exchange resin, concentrating the eluate, treating the concentrate with methyl alcohol and recovering the product.

The present invention relates to processes for the preparation of methyl 2-ketogluconate.

Previously known methods for the preparation of methyl 2-ketogluconate from the workup of fermentation broths of Pseudomonas organisms give methyl 2-ketogluconate in a state of purity insufficiently high for use in converting the methyl 2-ketogluocnate to sodium erythrobate or erythrobic acid without terminal purification steps. The instant process, in contradistinction to the prior art processes, enables the preparation of relatively pure methyl 2-ketogluconate in high yield without time-consuming and yield-reducing terminal purification procedures.

The fermentation broths employed in the practice of the invention are those obtained from the action of bacteria of the genus Pseudomonas on nutrient solutions containing a suitable carbohydrate or gluconate salt in accordance with the procedures given in U.S. 2,277,716, to Lockwood et al., which involves aerating and agitating a carbohydrate mash with bacteria of the genus Pseudomonas while cultivating the bacteria in a submerged state. The bacterial fermentation broths from the above fermentation procedures contain calcium 2-ketogluconate along with various by-products and impurities. It has been found that the presence of these by-products and impurities in even small quantities interferes with the yield and quality of methyl 2-ketoglyconate prepared from the calcium 2-ketogluconate in the fermentation broth.

The process of the invention is carried out in accordance with the following process steps:

(a) A fermentation broth obtained from the action of a bacteria of the genus Pseudomonas on a carbohydrate mash is treated with sulfuric acid in an amount sufficient to precipitate from about 85 to about 97, preferably from about 95 to about 97 percent of the calcium ions present in the fermentation broth. The sulfuric acid can be employed as an aqueous solution of any concentration, preferably in the range of from about 25 to about 100 percent. More dilute solutions can be employed, although they tend to increase the bulk of the broth with attendant disadvantages such as increased size of equipment, etc. The total quantity of sulfuric acid is, however, critical to the reaction. If substantially smaller quantities of acid are employed, the increased quantities of calcium ion present will require a much higher ion exchange capacity in the subsequent ion exchange step, which will render the procedure much less useful from a practical commercial standpoint. Substantially more sulfuric acid than the range given above will have a deleterious effect on the subsequent purification step, and will result in the obtaining of a less pure methyl 2-ketogluconate product. The amount of calcium ion present in the fermentation broth on which the amount of sulfuric acid is calculated can be readily obtained for any given fermentation broth by a simple calcium assay according to procedures well known to those skilled in the art. The sulfuric acid treated broth is then filtered. Optionally, solid filter acids such as Hy-Flo can be added to increase the filtration rate.

(b) The filtered solution is treated with activated charcoal. The amount and number of treatments with activated charcoal are chosen so as to give a substantially colorless or a pale yellow-colored solution after removal of the activated charcoal. Normally, two treatments with from about 5 to about 25, preferably about 10 grams of activated charcoal for each 5 liters of solution is sufficient. Optionally, activated charcoal can also be added with the sulfuric acid in step (a) above to reduce the amount of activated charcoal needed for this step. The activated charcoal can be of any type normally employed in purification procedures, such as lamp black, channel black, bone charcoal, specially treated coconut and wood charcoals, etc.

(c) The above solution is then treated with a strong cation exchange resin in the hydrogen cycle, preferably in the form of an ion exchange column, to remove calcium ion and other cation impurities as well as any residual color left by the activated charcoal treatment. The ion exchange resin is preferably Amberlite IR-200 although other cation exchange resins such as Amberlite IR-120, Dowex 50, etc., can also be employed. Water is normally employed to elute the 2-ketogluconic acid from the ion exchange material. The resulting water solution normally contains more than 30 percent water, usually in the range of from about 85 to about 95 percent water.

(d) The eluate from the above step is then concentrated, preferably under reduced pressure at a temperature of about 38 to about 40° C., until the water content ranges from about 19 to about 30 percent, preferably about 19 percent. This range of water is quite important since quantities of water substantially above 30 percent result in reduced yields of methyl 2-ketogluconate. It is difficult and impractical to remove substantially more water than the 19 percent lower limit.

(e) Methyl alcohol is then added to the above concentrate in from about 1.5 times to about 4.5 times, preferably about 3 times the weight of the concentrate. The solution is optionally but preferably treated with a small amount of activated charcoal, filtered, and the filtrate refluxed, preferably from about 4.5 to about 5.0 hours in an inert atmosphere, e.g., a nitrogen atmosphere. The refluxed solution is then cooled or allowed to cool to room temperature or lower, followed by filtration to give substantially pure methyl 2-ketogluconate. The methyl 2-ketogluconate obtained can be employed in the preparation of sodium erythrobate according to known procedures without any additional purification steps. The first crop yield of methyl 2-ketogluconate, based on the calcium 2-ketogluconate in the filtration broth is of the order of 85 percent and higher.

It is preferable to work up the mother liquor from the methyl 2-ketogluconate filtration by concentrating the mother liquor to dryness, adding methanol, concentrating to dryness again, once more adding methanol, concentrating, cooling, and filtering to given an additional quantity of slightly less pure product. This less pure product is preferably added to the next batch just prior to refluxing with methanol in step (e). The over-all yield of pure product is then of the order of about 95 percent or higher.

It is preferred in the above process to treat the fermentation broth with a flocculating agent prior to the treatment with sulfuric acid in step (a). Flocculating agents such as Primafloc C–7, which is a high molecular weight amine, are preferred, although other flocculating agents, such as tannic acid, etc., can also be employed. Generally from about 0.04 to about 0.50 percent by weight of flocculating agent based on the weight of fermentation broth is added, followed by filtration. However, where tannic acid is employed, it tends to darken the solution and contaminate the ion exchange resin, interfering both with the resin life and the regeneration of the resin.

The invention will be better understood from the following example which is given for illustration purposes only and is not meant to limit the invention.

Example 18 liters of fermentation mixture were obtained from the following fermentation process:

A 2.5 liter inoculation medium composed of:

| | Percent |
|---|---|
| Cerelose | 2 |
| $CaCO_3$ | 0.2 |
| Yeast autolysate | 0.5 | pH adjusted to pH 7.5.

*Pseudomonas fluorescens* was added to the following fermentation medium (60 gallons):

| | Percent |
|---|---|
| Cerelose | 11.0 |
| Corn-steep water solids | 0.25 |
| $MgSO_4 \cdot 7H_2O$ | 0.025 |
| Yeast autolysate | 0.20 |
| $KH_2PO_4$ | 0.06 |
| $CaCO_3$ | 2.7 |
| Urea | 0.2 |

The above mixture was agitated and aerated at about 30° C. for about 30 hours.

18 liters of the above fermentation broth, containing calcium 2-ketogluconate and fermentation by-products, were partially clarified by treatment with 270 ml. of Primafloc C–7 (2 percent aqueous solution), 1154 grams of 50 percent sulfuric acid, 90 grams of Hy-Flo and 90 grams of activated charcoal (Norite SG Extra) to give 17.3 liters of a slightly turbid red-brown solution.

5 liters of the above solution were further purified by stirring the solution with 10 grams of activated charcoal (Norite SG Extra) for 15 minutes, followed by filtering. The charcoal treatment was repeated twice.

One-half of the charcoaled solution was passed through an ion exchange column containing 150 grams of Amberlite IR–200 in the form of a resin bed 2.8 cm. x 38 cm. A 2-ketogluconic acid solution free of harmful impurities and by-products was obtained from the bottom of the column. The material was completely eluted from the column with 250 ml. of water. The 2-ketogluconic acid solutions were concentrated under vacuum at 40–38° C. to a clear, light yellow sirup weighing 319.6 grams. The sirup was dissolved in 1270 ml. of methanol, treated with 5 grams of Norite (SG Extra), and filtered. The charcoal was washed with 50 ml. of methanol. The solutions were combined with 31.2 grams of a second crop of methyl 2-ketogluconate from the mother liquor of a previous batch, and the mixture refluxed for 4.5 hours under nitrogen. During this period, crystallization of the ester started. The resultant methyl 2-ketogluconate suspension was cooled at −5° C. overnight, filtered, washed three times with 400 ml. of ice cold methanol, and dried at room temperature under vacuum. Yield: 255.1 grams (95.5 percent based on 2-ketogluconic acid in the clarified fermentation mixture). Melting point: 174.5–176.5° C. (uncorr.).

The methanolic mother liquors and washes were worked up for second crops by concentrating the combined solutions at atmospheric pressure to approximately ¼ the original volume and then under vacuum at 38° C. to a heavy suspension. Methanol, 100 ml., was added to the residue and the mixture concentrated under vacuum to dryness. Then, 100 ml. of methanol were added and the mixture concentrated to half the original volume. The methyl 2-ketogluconate suspension was then cooled at 0° C. overnight, filtered, washed three times with 75 ml. of ice cold methanol, and dried at room temperature under vacuum. Yield: 27.1 grams (10.7 percent based on 2-ketogluconic acid in the clarified fermentation mixture). Melting point: 165.5–167° C. (uncorr.).

We claim:

1. A process for the preparation of methyl 2-ketogluconate comprising the steps of:
    (a) treating a fermentation broth, obtained from the action of a bacteria of the Pseudomonas genus on a carbohydrate mash, with sulfuric acid in quantity sufficient to precipitate from about 85 to about 97 percent of the calcium ions present in said fermentation broth;
    (b) filtering the sulfuric acid treated fermentation broth;
    (c) contacting the resulting filtrate with activated charcoal, followed by separating the charcoal from contact with the filtrate;
    (d) contacting the filtrate with a strong cation exchange resin in the hydrogen cycle to form 2-ketogluconic acid;
    (e) eluting the 2-ketogluconic acid from the resin with water to form a solution of 2-ketogluconic acid in water wherein the water content of the solution is above about 30 percent;
    (f) concentrating the resulting water solution to a water content of from about 19 to about 30 percent;
    (g) adding methyl alcohol to the resulting concentrated solution;
    (h) refluxing the methyl alcohol solution to form methyl 2-ketogluconate; and
    (i) recovering substantially pure methyl 2-ketogluconate from the reaction mixture.

2. A process according to claim 1 wherein said fermentation broth prior to treatment with sulfuric acid is treated with a high molecular weight amine flocculating agent and filtered.

3. A process according to claim 1 wherein sulfuric acid is added in quantity sufficient to precipitate about 95 to about 97 percent of the calcium ions.

4. A process according to claim 1 wherein the mother liquors from step (a) are worked up by concentrating, adding methanol, and filtering to give an additional quantity of methyl 2-ketogluconate.

References Cited

UNITED STATES PATENTS

| 2,559,650 | 7/1951 | Lockwood et al. | 195—47 |
| 2,918,492 | 12/1959 | Hathaway | 260—483 |
| 3,234,105 | 2/1966 | Motizuki et al. | 195—47 |

LORRAINE A. WEINBERGER, *Primary Examiner.*

V. GARNER, *Assistant Examiner.*

UNITED STATES PATENT OFFICE

CERTIFICATE OF CORRECTION

Patent No. 3,381,027

April 30, 1968

Gerald Myer Jaffe et al.

It is certified that error appears in the above identified patent and that said Letters Patent are hereby corrected as shown below:

Column 1, line 54, "ketoglyconate" should read -- ketogluconate --. Column 2, line 15, "acids" should read -- aids --. Column 3, line 1, "given" should read -- give --. Column 4, line 59, "step (a)" should read -- step (i) --.

Signed and sealed this 27th day of January 1970.

(SEAL)
Attest:

Edward M. Fletcher, Jr.
Attesting Officer

WILLIAM E. SCHUYLER, JR.

Commissioner of Patents